United States Patent [19]
Terashita et al.

[11] Patent Number: 4,797,713
[45] Date of Patent: Jan. 10, 1989

[54] PHOTOGRAPHIC PRINTING METHOD

[75] Inventors: Takaaki Terashita; Hideaki Iijima, both of Kaisei, Japan

[73] Assignee: Fuji Photo Film Co., Ltd., Kanagawa, Japan

[21] Appl. No.: 81,098

[22] Filed: Aug. 3, 1987

[30] Foreign Application Priority Data

Aug. 4, 1986 [JP] Japan .............................. 61-183072

[51] Int. Cl.$^4$ ............................................. G03B 27/32
[52] U.S. Cl. ........................................ 355/77; 355/38
[58] Field of Search ..................................... 355/38, 77

[56] References Cited

U.S. PATENT DOCUMENTS

| | | |
|---|---|---|
| 4,260,244 | 4/1981 | Laska et al. ............................ 355/77 |
| 4,293,215 | 10/1981 | Rosborough, Jr. et al. . |
| 4,563,083 | 1/1986 | Shiota .................................... 355/77 |
| 4,659,213 | 4/1987 | Matsumoto ........................... 355/77 |

Primary Examiner—Monroe H. Hayes
Attorney, Agent, or Firm—Sughrue, Mion, Zinn, Macpeak & Seas

[57] ABSTRACT

When a number of prints of an image frame are made at a time or different times for the multiple printing, test printing, or re-printing thereof, it is needed to have them printed under the same condition and mode. However, it has been difficult to produce them without a deviation or variation of densities even when the same selected image frame is printed, because the photometric measurement of the image frame has been made conventionally before each time of printing for the operation and determination thereby of an exposure amount under which the printing is made, and because such photometric measurement at each time of printing gives an exposure amount which is slightly different at each time. In this invention, photometric data of a specific image frame which has been printed once are memorized, and when the specific image frame is to be printed once again, the frame is printed always at an entirely constant density on the basis of the data memorized and read-out at each succeeding printing.

9 Claims, 5 Drawing Sheets

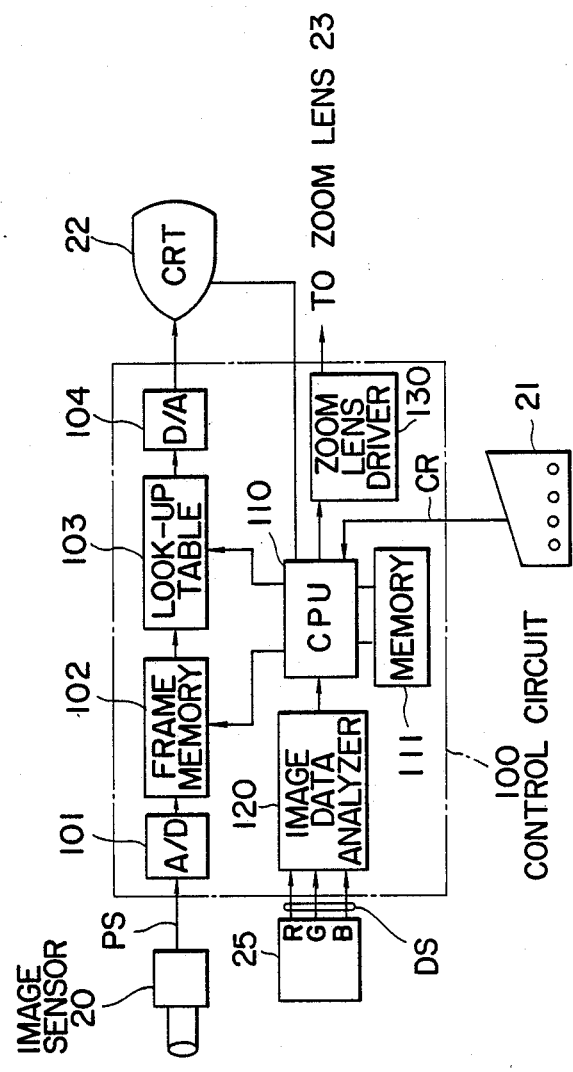
F I G. 2

PHOTOGRAPHIC PRINTING METHOD

BACKGROUND OF THE INVENTION

This invention relates to a method for printing a photographic picture, by which a selected image frame on an original picture film can always be printed with a same condition.

When an image frame on an original film such as a negative film is printed by a conventional photographic printing apparatus, the image frame is subjected to photometry each time by means of LATD (Large Area Transmittance Density) or an image sensor such as disclosed for example in Japanese Patent Laid-open No. 60-177337. The above image sensor method is referred to "scanner photometry" hereinafter. It has been common that a printing exposure amount or an exposure correction value obtained thus by such scanner photometry is not memorized by the apparatus.

Hence, even when a selected same image frame is printed by a photographic printing apparatus having a photographic system for the scanner photometry once again or repeatedly for multiple printing, test printing, re-making and re-printing of the selected image frame, the same image frame has to be subjected to photometry at each time when such printing occurs. That is, an exposure calculation operation is made on the basis of the photometric data each time when even the printing is made. There is a drawback in this way of the photometric printing that even when the same image frame is repeatedly or one again printed, the exposure amount differs each time whereby densities of the prints vary each time. This variation or deviation of exposure correction amount is due to that when a negative film is removed once from a position where its image density was measured, it can hardly be relocated exactly to the same position, that in the case of image characteristic values such as the maximum densities or the minimum densities being employed as reference data, then reading undergoes variations or deviations on account of even slight fluctuations of the negative film or a small electrical noise thereabout, and that a different exposure operation formula could consequently be employed on account of even a small variation or deviation of the image characteristic values whereby there is produced a dispersion of the exposure correction amount.

Especially when a test print is made for a large sized picture, employing a photographic printer provided with a system having the scanner photometry, and if the test print is not identical with lately corrected multiple prints, there should be produced serious problems including a waste of labor and printing papers, an operational confusion and resulting unreliability on the photographic printer. It could be said that these problems are inherent to conventional photographic printing method. There has been developed a countermeasure which is to cope with such problems and in which an exposure correction amount is outputted on a photographic printing paper, and a next printing is made by inputting the outputted value while an input is manually made so that the exposure correction amount is interrupted. This countermeasure accompanies however a drawback that one is apt to forget to have the exposure correction amount interrupted or reoperated, and does not constitute therefore an entirely reliable solution.

SUMMARY OF THE INVENTION

In view of the above-described contemporary backgrounds, it is a principal object of this invention to provide a photographic printing method by which prints of an identical density can be obtained always without any dispersion even when a selected same image frame is printed more than one time after test printing and so on.

According to one aspect of this invention, for achieving the objects described above, there is provided a photographic printing method which comprises the steps of: subjecting image frames on an original film to be printed to a photometry for obtaining an exposure amount for each image frame and thereby consequently obtaining image characteristic value and an exposure correction amount for each image frame as data memorized; and printing the subjected image frame either by utilizing the memorized data when said subjected image frame is identical with one of the image frames, data of which have been memorized, or by utilizing the data which have been obtained by the photometry but have not been memorized when said subjected image frame is not identical with any one of the image frames, data of which have been memorized.

According to another aspect of this invention, there is provided a photographic printing method which comprises the steps of: subjecting image frames on an original film to be printed to a photometry for obtaining an exposure amount for each image frame and thereby consequently obtaining an image number and an exposure correction amount for each image frame as data memorized; and printing the subjected image frame either by utilizing the memorized data when said subjected image frame is identical with one of the image frames, data of which have been memorized, or by utilizing the data which have been obtained by the photometry but have not been memorized when said subjected frame is not identical with any one of the image frames, data of which have been memorized.

The nature, principle and utility of the invention will become more apparent from the following detailed description when read in conjunction with the accompanying drawings.

BRIEF DESCRIPTION OF THE DRAWINGS

In the accompanying drawings:

FIG. 2 is a block diagram similar to FIG. 1, in which a part of the photographic printer is shown in more detail;

DESCRIPTION OF THE PREFERRED EMBODIMENTS

Figure 1:
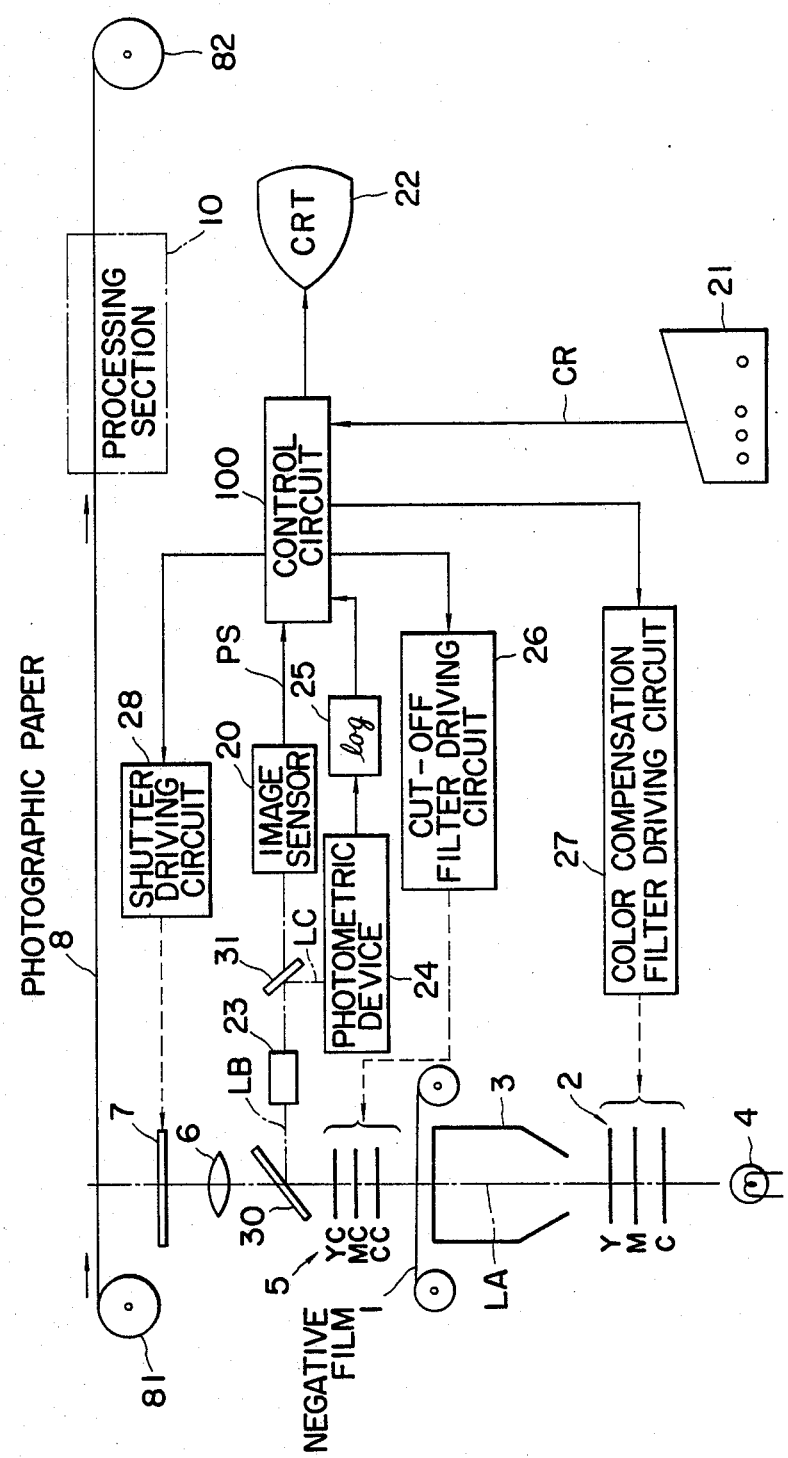
FIG. 1 is a block diagrammatic view showing an example of a photographic printing apparatus which is employable for the practice of this invention method.

In FIG. 1 which shows an example of a photographic printing apparatus of a color compensation filter and cut-off filter system, to which the present invention method is applicable, a negative film (an object) 1 is illuminated by a light source 4 through color compensation filters 2 of yellow Y, magenta M and cyan C and through a mirror box 3. The light penetrated through the negative film 1 is exposed on a photographic paper (or color paper) 8 via cut-off filters 5 of YC, MC and CC, a lens system 6 and a black shutter 7. The photographic paper 8 wound on a supply reel 81 is intermittenly wound up onto a take-up reel 82 after it has been exposed at a printing section along an optical axis LA and after it has been developed at a processing section 10. A mirror 30 is removally provided between the cut-off filters 5 and the lens system 6 in a path of the optical axis LA, so that another optical axis LB converted at about a right angle to the optical axis LA is produced. There is provided a zoom lens 23 next to the mounted mirror 30 in the emitting direction of the another optical axis LB, while in the advanced path of the optical axis LB, there is also provided an image sensor 20 which works as an image pick-up means. Image signals PS transmitted from the image sensor 20 are inputted into a control circuit 100. In the path of the additional optical axis LB between the zoom lens 23 and the image sensor 20, there is removally mounted another mirror 31 which produces a further another optical axis LC converted from the optical axis LB at about a right angle thereto. In advance of the mirror 31 thus mounted in the path of the optical axis LC, there is provided a photometric device 24 such as an image sensor, photodiodes and the like for detecting image densities of three primary colors of blue B, green G and red R. The image signals detected by the photometric device 24 are converted to density signals DS by a logarithmic conversion circuit 25 and inputted to the control circuit 100, whereby printing exposure conditions are determined by a predetermined exposure operational formula and whereby the color compensation filters 2, the cut-off filters 5 and the black shutter 7 are controlled respectively through a color compensation filter driving circuit 27, a cut-off filter driving circuit 26 and a shutter driving circuit 28 so that an image from the negative film 1 conveyed to the printing section is printed onto the photographic paper 8 and subjected at the processing section 10 to the devlopment, bleaching, fixing, washing and drying.

The mirror 30 is manually or automatically removed outside of the optical axis LA when the negative film 1 is being printed, while it is manually or automatically set in the path of the optical axis LA as illustrated in FIG. 1 when a CRT 22 is being operated by the image sensor 20 and when the photometric device 24 is also being operated. The mirror 31 is mounted in the optical path LB as illustrated in FIG. 1 when the negative film 1 is being subjected to the measurement by the photometric device 24, while it is manually or automatically removed from the path of the optical axis LB when a display is being given to the CRT 22. The zoom lens 23 works to obtain always an image of a constant size even if the negative film 1 differs in its size. Dimensional information on the negative film 1 is manually or automatically inputted into the control circuit 100 so that the zoom lens 23 can be actuated thereby.

The image on the negative film 1 caught by the image sensor 20 through the mirror 30 and the zoom lens 23 is transmitted to the CRT 22 through the control circuit 100 and displayed on the CRT 22 by such luminance and color conditions which are correspondent to an exposure amount obtained by a basic exposure formula. The control circuit 100 can also receive a manually inputted correction value CR through the operation of a manual input adjustment apparatus 21 such as a keyboard.

Detailed structures of the control circuit 100 is shown in FIG. 2, in which the image signals PS from the image sensor 20 are memorized in a frame memory 102 after they have been converted to digital values by an A/D (analog-to-digital) converter 101. When the image signals PS of one frame is memorized in the frame memory 102, the data are read out and inputted into a look-up table 103 where they undergo, in accordance with predetermined tables, negative-positive conversion, gradation conversion, color correction and so on. Then, data outputted from the look-up table 103 are converted by a D/A (digital-to-analog) converter 104 to image indication signals of analog format, and are transmitted to the CRT 22. On the other hand, photometric data from the photometric device 24 are inputted into an image data analyzer 120 as the density signals DS through the logarithmic conversion circuit 25. The data analyzed in the image data analyzer 120 are inputted into a CPU 110. The CPU 110 is operatively connected with a memory 111 so that it controls the operational sequence of the frame memory 102 and the look-up table 103, and so that it controls, as operated, the luminance and tone of the images displayed on the CRT 22. In accordance with the dimensional information on the negative film 1, the zoom lens 23 is actuated to a predetermined magnification, by a zoom lens driver 130, through the CPU 110.

Figure 3:
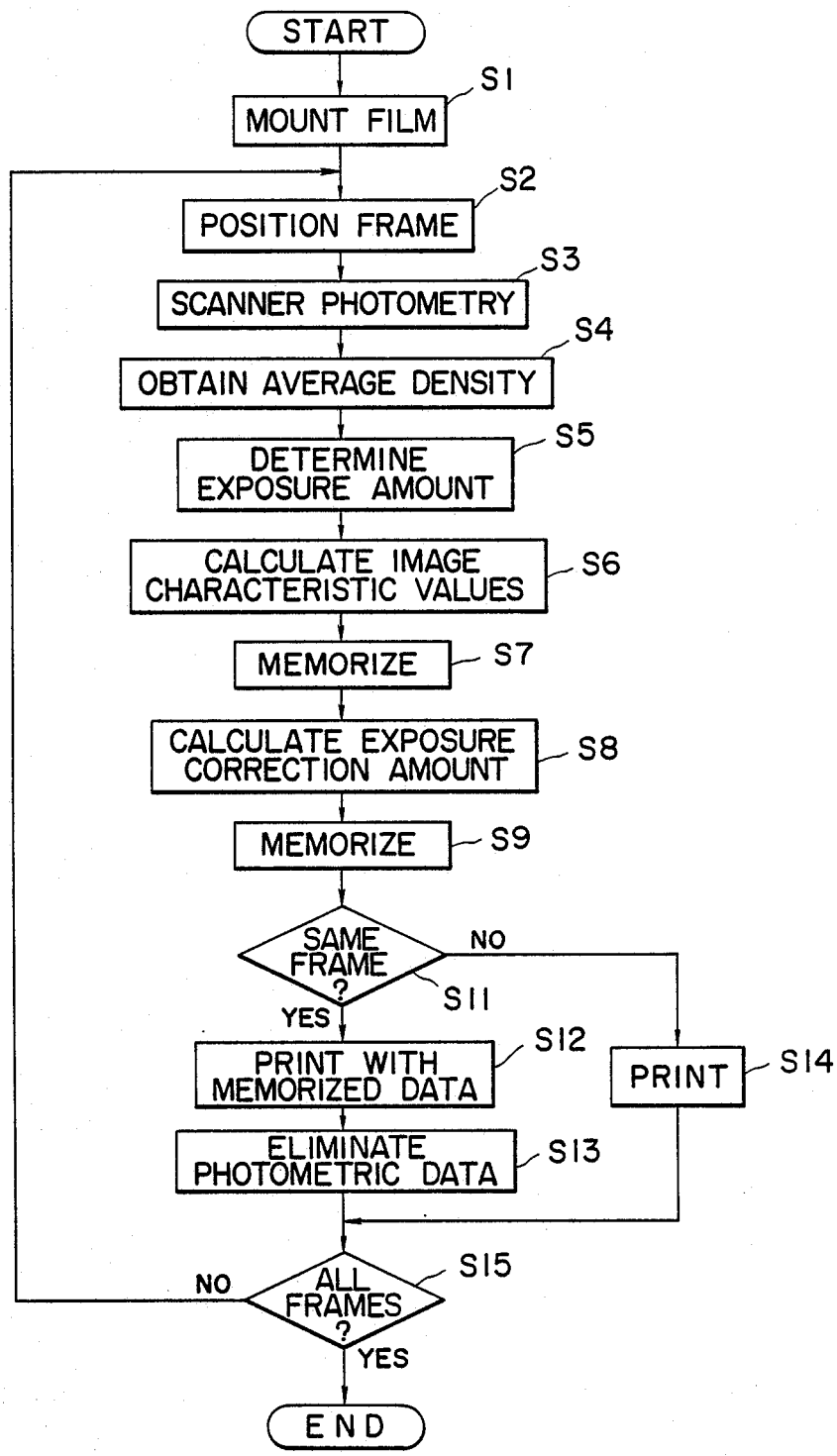
FIG. 3 is a flow chart showing an example of this invention method.

With the photographic printing apparatus as described above, the printing method in accordance with this invention is carried in accordance with a flow chart as shown in FIG. 3 for example.

Figure 4A:
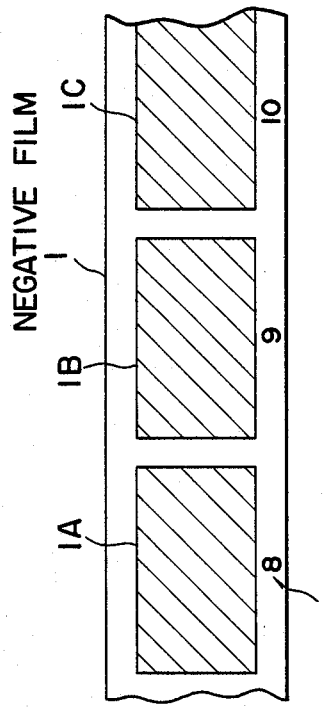
FIGS. 4A and 4B are plan views for the explanation of image frames of the negative film, respectively.
Figure 5:
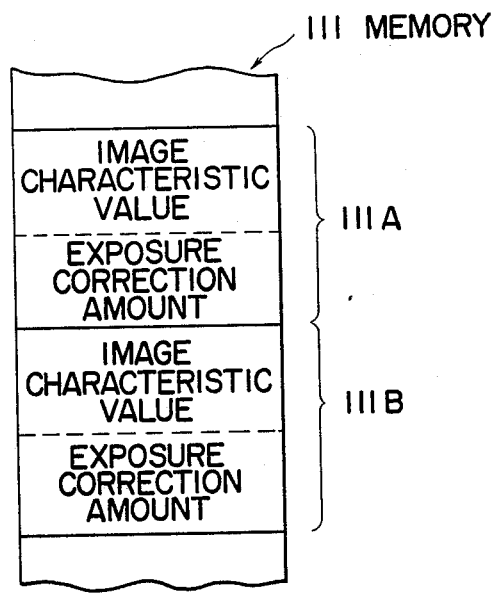
FIG. 5 is a view showing an example of arrays of data to be memorized.

The negative film 1 (or original film) as shown in FIG. 4A is mounted at a predetermined position of the photographic printer (Step S1), and the first image frame 1A of the negative film 1 is positioned at the printing section (Step S2). Then, the positioned frame is subjected to the scanner photometry by the image sensor 20 and the photometric device 24 (Step S3). An average density of the image frame is obtained by means of the photometric data given by the photometric device 24 (Step S4), and an exposure amount is determined by the CPU 110 (Step S5). By the employment of the above photometric data and in accordance with such method as described in Japanese Patent Laid-open No. 60-177337 for example, the image characteristic values and the exposure correction amount are obtained by calculation, and the calculated data are memorized in the memory 111 (Steps S6 to S9). Therefore, in a memory area 111A of the memory 11, there is memorized an image characteristic value and an exposure correction amount for the image frame 1A as shown in FIG. 5. That is, image data comprising of the image characteristic value and the exposure correction amount for each image frame are stored in each corresponding memory area in the memory 111 one by one in the succeeding order of frames.

Thereafter, it is automatically determined whether or not an image characteristic value which is identical to that of the selected image frame 1A has been memorized in the memory 111 with respect to the identical image frame which has been printed (Step S11). When it is determined that the selected image frame 1A is identical to the one which has been memorized in the memory 111, the image frame 1A is printed by means of the exposure amount obtained by the photometry at the above step S5 and the exposure correction amount which has been memorized in the memory 111 (Step S12). In this instance, the image characteristic value and the exposure correction amount for the present image frame obtained in the above steps S6 to S9 are not utilized and they are eliminated from the memory 111 (Step S13). This elimination of the image data shall not adversely affect the future printing, since the image data which has been previously memorized with respect to the identical image frame remain in the memory 111. When the same frame is found in the above step 11 that the present image frame is not identical to any frame, data of which has already been memorized, the image frame is printed by means of the exposure correction amount which has been measured photometrically, memorized and subjected to operation with respect to the present image frame at the steps S3 to S9 (Step S14).

In the determination whether an image frame is identical to a previously memorized image frame or not, the former shall be determined as identical with the latter if the deviation of their image characteristic values is within ±5%. If the deviation is beyond the above tolerance, they are determined as not identical to each other. The comparison of image frames by way of their image characteristic values is disclosed for example in Japanese Patent Laid-open No. 54-26729 and No. 59-83280. In place of the image characteristic values, data on picture elements can be utilized for the determination of identity between two image frames. That is, the data on the picture elements of two image frames are compared to each other for obtaining an average deviation therebetween and for determining thereby their identity. In this method, it is not practical to have all picture element data memorized, while it is prerequisite that the number of data on the picture elements can represent well the characteristics of the image frames, nevertheless the number should be reduced as small as possible. It shall be noted that data on the picture elements are also included to those image characteristic values which are employable in this invention method.

The reference for judgement if an image frame is identical with the one which has been already memorized, is made succeedingly one by one only with respect to a specific area of the memorized data in the memory 111 to which the image frame belongs. When it is found that no identical data exists in the specific areas, it is decided that the image frame is not identical with any data in the memory 111. However, when it is apparent that an image frame is going to be subjected to the photometry not for the first time (in the case of, for example, making a corrected print after a test printing), memory data which has the greatest resemblance to the image frame could be used even if the data identical to the image frame have not been found.

After an image frame data of which has not previously been memorized is printed by using its own fresh data, it is checked if all required frames of the negative film 1 have been printed or not. If they have not been printed, a remnant image frame such as the frame 1B is conveyed and positioned at the printing section, and the photometry and the printing as described above are repeated until all image frames of the negative film 1 are printed.

While in the embodiment described above, the judgement of identity of an image frame with memorized data is made by the comparison of the image characteristic values or the image data, the judgement could be made also by the comparison of frame numbers affixed to respective image frames 1A, 1B, ... of the negative film 1 or printing numbers which have been used in printing operation, with those frame numbers or printing numbers of the negative films which have been previously printed and memorized in the memory through their input thereto through the manual input adjustment apparatus 21.

Figure 4B:
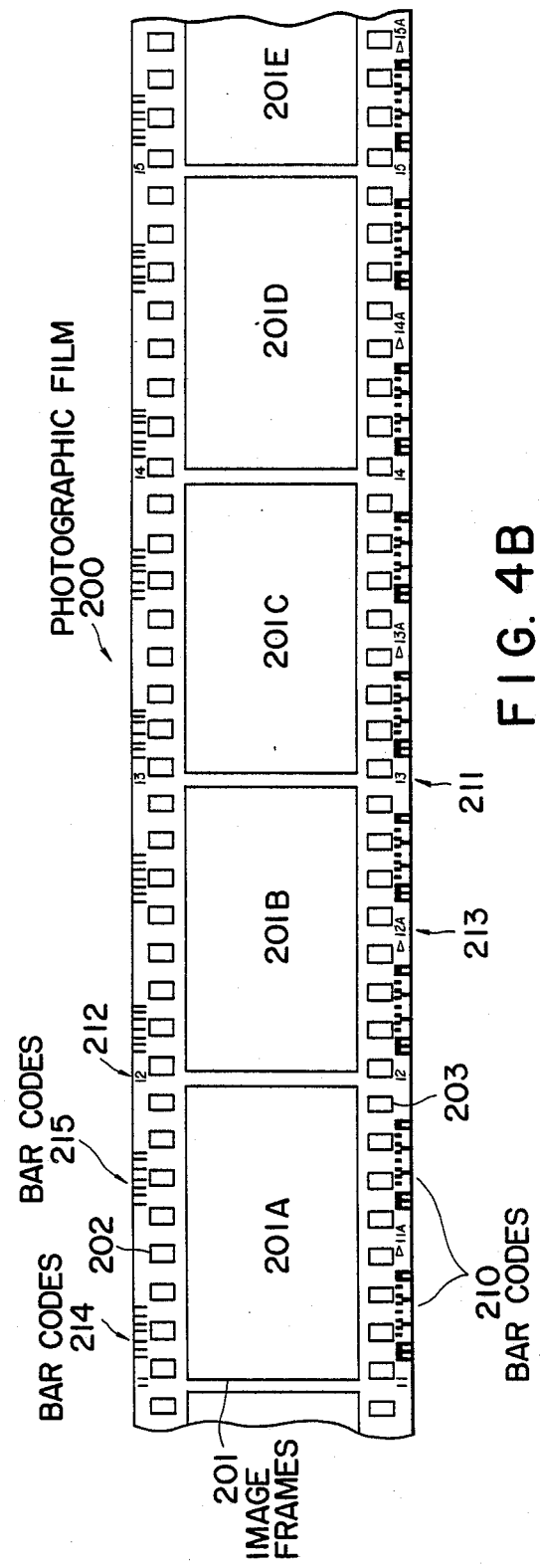
Figure 6:
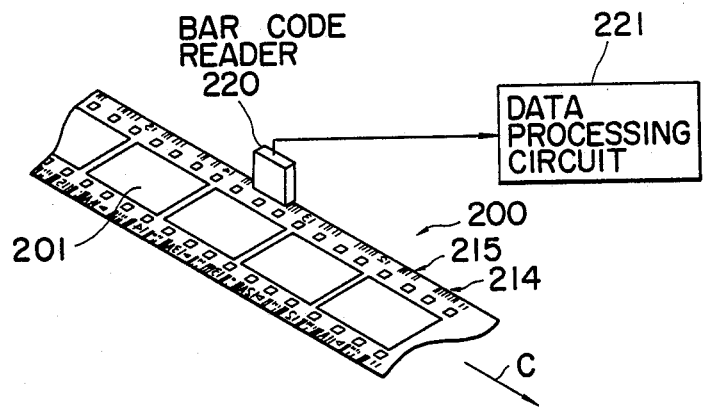
FIG. 6 is an explanatory perspective view showing the reading of bar codes of the negative film.

Image frame numbers could automatically be read out by means of bar codes affixed to side edges of a negative film. An example of such bar codes is shown in FIG. 4B, in which a photographic film 200 is 135mm in type, having a series of full-sized image frames 201 (201A, 201B, ...) with predetermined distances therebetween. Adjacently to both sides of the photographic film 200, there are provided a number of perforations 202 and 203 with constant distances therebetween, which perforations operatively engage with sprockets (not shown) for transferring the photographic film 200. On the photographic film 200 between its one of edges and the perforations 203, there are formed, at the time of manufacture of the film, a number of identically shaped bar codes 210 with specific distances therebetween. These bar codes 210 indicate a name of manufacturer, manufacturing lot numbers and others of the photographic film 200. On the photographic film 200 between the edges in which the bar codes 210 are formed and the perforation 203 between its another edge and the perforations 202, there are formed, at the manufacture of the film, a series of main frame numbers 211 and 212 with constant distances therebetween, along its longitudinal direction, and in correspondence to respective image frames 201. The main frame numbers 211 and 212 are formed on both longitudinal sides of the photographic film 200 with pitches same to those with which the image frames 201 are formed, and indicated one by one by positive numbers beginning with "1" at a starting end of the photographic film 200. Auxiliary frame numbers 213 are formed between the main frame numbers 211 and between the bar codes 210 on one of sides of the photographic film 200 with lags of a half of the aforementioned pitch apart from respective main frame numbers 211. The auxiliary frame numbers 213 are recorded by the number of a preceding main frame affixed with a letter "A". There are also formed, at the time of manufacture of the film, bar codes 214 and 215 between the main frame numbers 212. They are located on one side of the photographic film 200 so as to be apart from the main frame numbers 212 with constant distances in the right-handed direction in figure. When those bar codes 214 and 215 are read out by a bar code reader 220 and the read data is transmitted to a data processing circuit 221 as shown in FIG. 6, the main frame numbers 212 and the auxiliary frame numbers 213 are detectable respectively. The bar code reader shall preferably be combined with an automatic film transferring mechanism which automatically conveys the photographic film 200 and an image-edge detecting mechanism which detects a stop position of the photographic film 200 and makes it stop, so that by inputting an image frame member or a printing number to the mechanisms through the manual input adjustment apparatus 21, the photographic film 200 shall stop automatically when the inputted image frame comes under the bar code reader 220 whereby necessary data memorized in the memory 111 could be read out automatically and instantly.

In case of the comparison of identity of the image frame with memorized data by means of the frame number or the printing number, too, the comparison operation may be made either manually or automatically. Further, in this instance after the comparison, the image frame may be subjected to photometry (Step S3) and then to printing.

If a modification or correction of an exposure value is found necessary by and with respect to the test printing, it is advisable to determine a final exposure amount for future printing with reference to such exposure amount which is based upon the average density newly obtained by corrected printing, the exposure correction amount which is stored in the memory, and the modification or correction value which is found necessary by the test printing.

Although it has been described that image data of all the negative films which have been printed once in the photographic printer are to be memorized in the memory 111, such memorization may be limited only to a made for test printing, because deviation of a printing from the test printing shall, specifically and more adversely compared to other printing cases, induce serious problems including waste of photographic papers, labors and time as mentioned above. Such memorization would be limited to those treated for a period of two days at the longest for example so that old data shall be replaced successively by new data. If it is decided that there are memorized two identical image frames, one of them memorized more lately would only be kept in the memory. While it is described above that an exposure amount based on an average density of an image is obtained by the scanner photometry, it is within the scope of this invention to obtain an exposure correction amount by using a monitored image as in the case of a well-known LATD photometry.

In the present invention method, as described above, an image frame can always be printed with the same density and without any deviation of density even when it is printed again with a lag of time, since it is judged by means of image characteristic values representing structures and characteristics of the image frame or by means of image frame or printing numbers thereof, before the printing, if the image frame is identical or not with any one of image frames which have been previously printed and data of which have been memorized, and since when it is decided that the image frame is identical with one of them, the frame is printed on the basis of an exposure amount which is determined with reference to the data previously memorized with respect to the image frame.

It should be understood that many modifications and adaptations of the invention will become apparent to those skilled in the art and it is intended to encompass such obvious modifications and changes in the scope of the claims appended hereto.

What is claimed is:

1. A photographic printing method which comprises the steps of:
   maintaining a storage of preprocessed exposure correction data and preprocessed image characteristic data for each representative one of a plurality of image frames having been previously processed, each respective preprocessed exposure correction data being related to a respective frame image by a respective preprocessed image characteristic data;
   subjecting an image frame on a negative film having an image to be printed, to a photometry operation for obtaining processing image characteristic data and processing exposure correction data for said image frame;
   determining whether preprocessed exposure correction data is currently being stored for said image frame of said negative film by comparing said processing image characteristic data to said preprocessed image characteristic data; and
   printing said image frame of said negative film by utilizing said preprocessed exposure correction data when a result from said comparison determines that data is currently being stored for said image frame, and by utilizing said processing exposure correction data when a result from said comparison determines that data is not currently being stored for said image frame.

2. A photographic printing method as claimed in claim 1, in which said comparison determines that preprocessed exposure correction data is currently being stored when a deviation of the image characteristic values is within ±5%.

3. A photographic printing method as claimed in claim 1, in which said preprocessed and said processing image characteristic data are data corresponding to predetermined picture characteristics of an image frame.

4. A photographic printing method as claimed in claim 1, in which said comparison determines that preprocessed exposure correction data is not currently being stored if said processing image characteristic data does not match preprocessed image characteristic data in a specific area in a memory.

5. A photographic printing method which comprises the steps of:
   maintaining a storage of preprocessed exposure correction data and preprocessed frame identification data for each respective one of a plurality of image frames having been previously processed, each respective preprocessed exposure correction data being related to a respective frame image by a respective preprocessed frame identification data derived from frame identification information being located on a negative film, adjacent to said respective frame image;
   subjecting an image frame on a negative film having an image to be printed, to a photometry operation for obtaining processing exposure correction data, and processing frame identification data which is derived from frame identification information being located on said negative film, adjacent to said respective frame image;
   determining whether preprocessed exposure correction data is currently being stored for said image frame of said negative film by comparing said processing frame identification data to said preprocessed frame identification data; and
   printing said image frame of said negative film by utilizing said preprocessed exposure correction data when a result from said comparison determines that data is currently being stored for said image frame, and by utilizing said processing exposure correction data when a result from said comparison determines that data is not currently being stored for said image frame.

6. A photographic printing method as claimed in claim 5, in which said preprocessed and said processing frame identification data correspond to a frame number printed adjacent to each image frame of a negative film, and said frame number is employed in said comparison for the determination of whether or not a preprocessed exposure correction data is currently being stored for an image frame.

7. A photographic printing method as claimed in claim 6, in which said image number is represented by bar code given to said negative film.

8. A photographic printing method as claimed in claim 7, in which said bar codes are formed on side edges adjacent to image frames of said negative film.

9. A photographic printing method as claimed in claim 8, in which said bar codes further include auxiliary frame numbers.

* * * * *